No. 694,251.

Patented Feb. 25, 1902.

E. CANAPLE & F. THIÉBAUX.
PAWL AND RATCHET BRAKE.
(Application filed Oct. 26, 1901.)

(No Model.)

3 Sheets—Sheet 1.

WITNESSES
A.H.Davis
Walton Harrison

INVENTORS
Eugène Canaple
Félix Thiébaux
BY
ATTORNEYS

No. 694,251. Patented Feb. 25, 1902.
E. CANAPLE & F. THIÉBAUX.
PAWL AND RATCHET BRAKE.
(Application filed Oct. 26, 1901.)
(No Model.) 3 Sheets—Sheet 2.
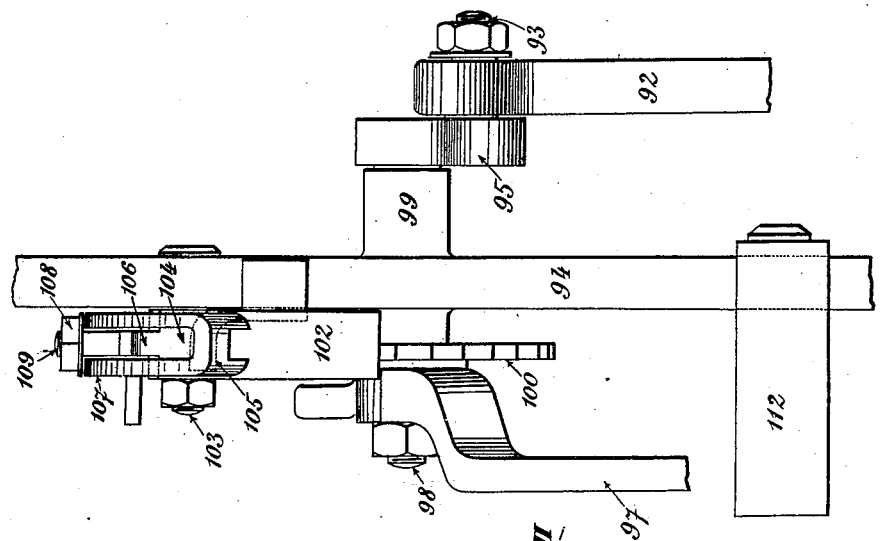
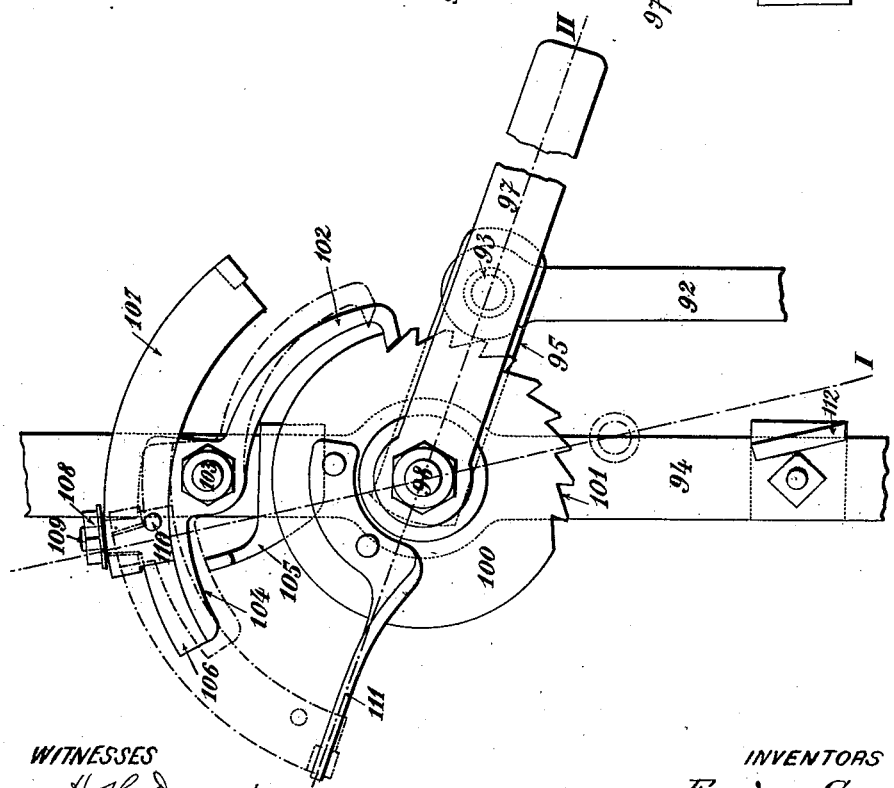
WITNESSES
INVENTORS
Eugène Canaple
Félix Thiébaux
BY
ATTORNEYS

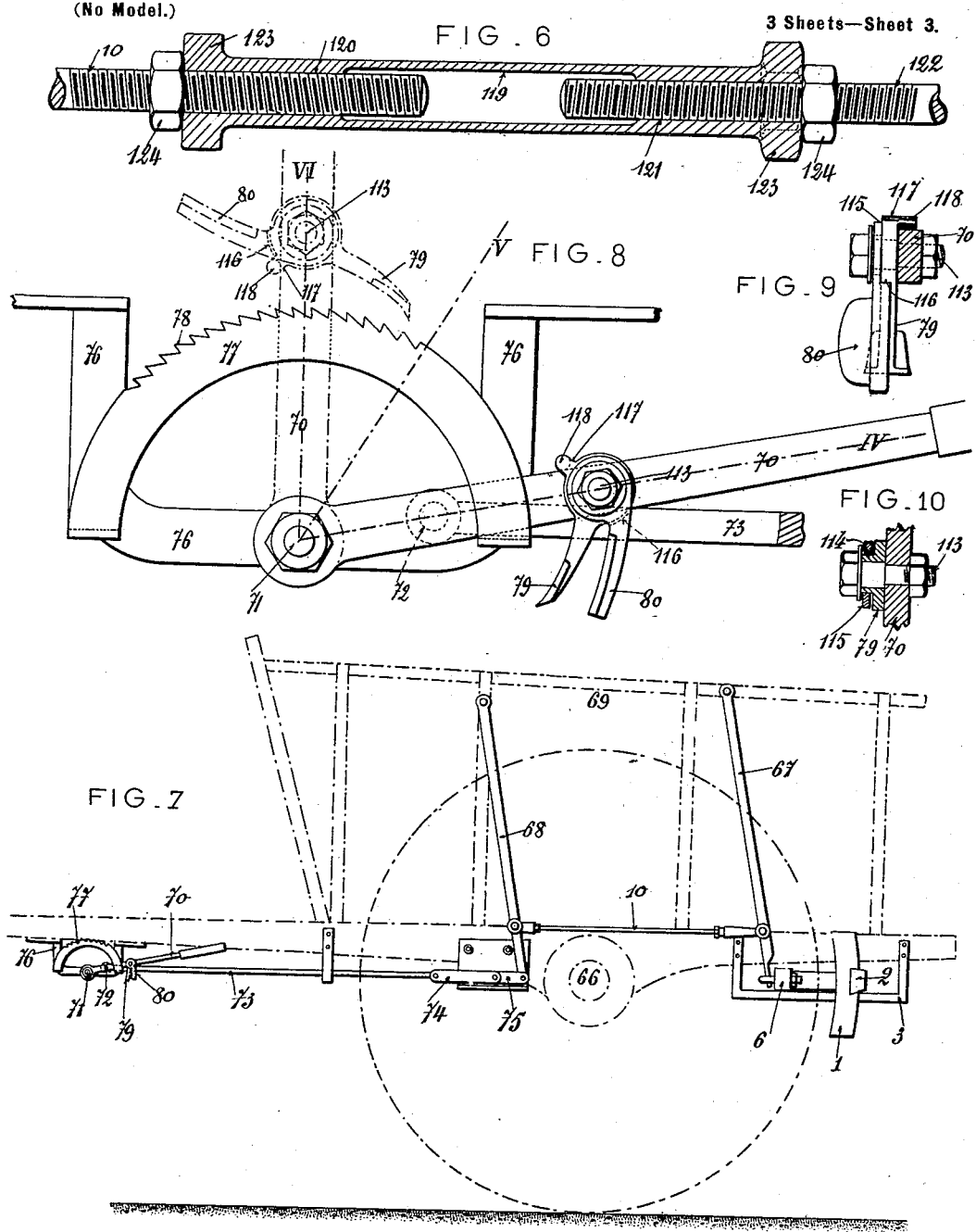

UNITED STATES PATENT OFFICE.

EUGÉNE CANAPLE AND FELIX THIÉBAUX, OF GERMIGNY-L'EVÊQUE, FRANCE.

PAWL-AND-RATCHET BRAKE.

SPECIFICATION forming part of Letters Patent No. 694,251, dated February 25, 1902.

Application filed October 26, 1901. Serial No. 80,100. (No model.)

*To all whom it may concern:*

Be it known that we, EUGÉNE CANAPLE, mechanician, and FELIX THIÉBAUX, gentleman, citizens of the Republic of France, residing at Germigny-l'Evêque, department of Seine-et-Marne, in the Republic of France, have invented certain new and useful Improvements in Pawl-and-Ratchet Brakes, of which the following is a specification.

Our invention relates to a pawl-and-ratchet brake intended more particularly for vehicles, but which may also be used for lifting and other similar devices.

We have improved pawl-and-ratchet devices as made heretofore by the application, in combination with the same, of very simple elements which allow of the driver preparing the braking operation by the separation of the pawl and ratchet without having to act on the lever or other controlling device, so that the latter may, if necessary, be grasped by the two hands, the separation of the pawl and ratchet then taking place automatically. This improvement is of great importance on account of the great number of accidents which now occur through the sudden jump of the lever when the separation of the pawl and ratchet takes place, such accidents being avoided by the use of our improved device.

In the accompanying drawings we show, by way of example, several forms which incorporate the features of our invention.

Figure 1:
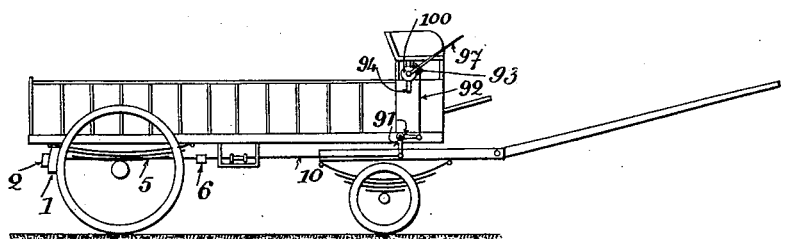
Figure 2:
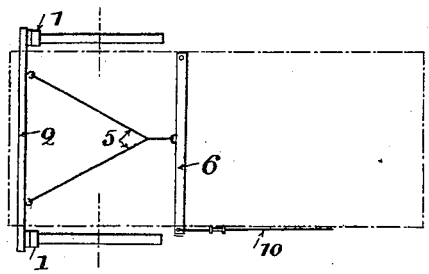
Figure 3:
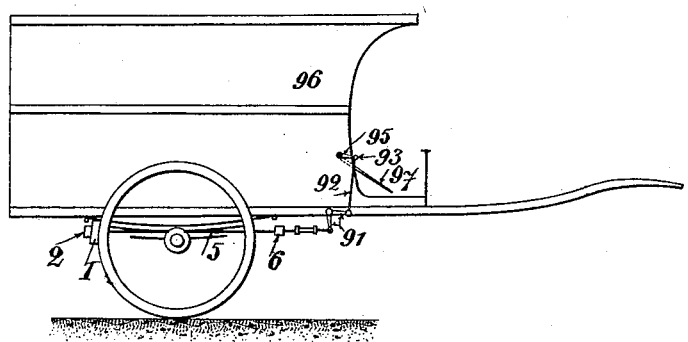

Figures 1 and 2 show diagrammatically in elevation and plan, respectively, how our improved brake is fitted to a road-car, the manner of fitting the same to a road-car of different character being shown in Fig. 3. Figs. 4 and 5 show a pawl-and-ratchet mechanism in front and side view, respectively. Fig. 6 is a section of a controlling device for a pull-rod. Fig. 7 shows the arrangement of a modified form of brake for a road-car. Fig. 8 is an elevation of the brake shown in Fig. 6. Fig. 9 is a side view of the brake shown in Fig. 6, and Fig. 10 is a section through the operating-lever 70, showing the bolt 113 and its connections.

In Figs. 1 and 2 the cross-piece 2, carrying the shoes 1, is connected by rods 5 to a lever 6, pivoted under the vehicle, and the free end of which is connected by a pull-rod 10 to a bell-crank lever 91. The latter, the upper end of which is pivoted on the vehicle, is connected by a rod 92 to a controlling-handle 93, forming a part of the mechanism shown in detail in Figs. 3 and 4, and which is supported near the driver's seat by a frame 94, firmly fixed to the vehicle. The same arrangement is applicable to the road-car shown in Fig. 3, with this peculiarity—that the connecting-rod 92 and crank 95 are located outside the hood 96 of the vehicle, while the pawl-and-ratchet mechanism and the clamping-lever 97 are located inside.

In the mechanism shown in Figs. 4 and 5 the lever 97 is fixed to a spindle 98, free to revolve in a socket 99, integral with or fixed to the frame 94. On the said spindle are also fixed the crank 95 and a disk 100, a part of the periphery of the latter being provided with inclined teeth 101. Above the said disk is located a pawl 102, pivoted on a stud 103, fixed to the frame 94. The said pawl is provided with a lip, which takes between the teeth 101, and with a stem 104, which in moving down comes in contact with a stop 105, fixed to the frame 94. On the said stem is formed a tongue 106, projecting upward, and along which is slidably mounted a balance-weight 107 in the shape of a long ring or link. A nut 108, screwed on a threaded rod 109, projecting from the tongue 106, prevents the balance-weight 107 from leaving the stem 104, while allowing it at the same time to slide easily. A pin 110 is fixed to the balance-weight 107 in such a manner as to come in contact with a finger 111, fixed to the disk 100, and to be carried forward by the same, and a pin 112 is fixed to the frame 94 in such a manner as to come in contact with the lever 97 and to limit the downward movement of the latter. When the mechanism is at rest, the lever 97 is in its lowermost position, (shown by line I,) and the disk 100 is so turned that the pawl 102, pressed by the balance-weight 107, rests on the smooth part of the disk. When the lever 97 is raised and brought into the position shown at II, for example, the crank 95 is so turned as to pull the connecting-rod 92, and consequently to clamp the shoes 1 through the medium of the lever 91, the rod 10 of lever 6, the rods 5, and the crosspiece 2. At the same time the pawl 102, which is still being pressed by the balance-weight 107, becomes engaged with one of the teeth 101 and prevents the mechanism from returning to its initial position. When it is required to unlock the shoes or brake, the balance-weight 107 is slid backward, as shown by the dotted lines in the drawings, so that its weight by acting on the stem 104 tends to raise the pawl 102. The lever 97 is then slightly raised in order to allow the pawl to escape from the tooth 101, and said lever then moves upward until the stem 104 comes in contact with the stop 105. Finally the lever 97 is moved down to the position shown at I, and that unlocks the brake. At the same time the finger 111 comes into contact with the pin 110, and thus brings the balance-weight 107 back into its initial position. It will be understood that the balance-weight 107 can be slid by a very slight movement of the hand and that the unlocking of the brake cannot take place simultaneously even when the said balance-weight has been slid back, so that the driver can control the separation of the pawl and ratchet at one time and not unlock the brake until later on.

Fig. 6 shows a pull-rod 10, provided with a controlling device comprising a socket 119, having screw-threads in the interior at 120 and 121 to the right and left, respectively, and which engage with corresponding screw-threads formed on the one hand on the rod 10 and on the other hand on the rod 122, located in line with the said socket. On the socket 119 are formed shoulders 123, one of which is provided with a flange so shaped as to serve as a key. Stop-nuts 124 are screwed on the rods 10 and 122, so as to bear against the shoulders 123 and maintain the parts in the adjusted position.

The improved brake can be modified, as shown in Fig. 7, when the hub of the wheels of the vehicle interferes with the passage of the pull-rod, and in that case we use a sort of parallel motion passing above the hub of a wheel. In this modified form the cross-piece 6, connected to the cross-piece 2 of the shoes, is located toward the back of the vehicle and is guided by one of the slideways 3. To allow the pull-rod 10 to pass above the hub 66 of the wheel, we use two auxiliary levers 67 and 68, pivoted at the upper part to the side guards 69 of the vehicle and connected at the lower part, respectively, to the cross-piece 6 and to the operative parts, while the ends of the pull-rod 10 are pivoted at suitable points upon the said levers. The operating-lever 70 of the brake is pivoted to a spindle 71, integral with a support 76, fixed to the shaft, and it is provided with a pin 72, to which is pivoted a rod 73, connected to the links 74 75 at the lower end of the lever 68. This double toggle-gearing has for its purpose to allow of the cart being upset backward when the shafts are pivoted or hinged.

The pawl-and-ratchet device used to maintain the brake locked is a modified form of that hereinbefore described and in which the balance-weight of the pawl is made to rock instead of sliding. It comprises (see Figs. 8 to 10) a pawl 79, pivoted at 113 to the clamping-lever of the brake 70 and acting on a toothed segment 77, fixed to the frame 76. To the pawl 79 is pivoted a balance-weight 80, capable at one time of pressing by its weight the pawl against the segment 77 and at another time of moving the pawl away from the same. For that purpose the pawl is provided with a circular shoulder 114, concentric to the spindle 113, and on which can freely ride a part reduced in thickness 115 of the balance-weight 80. The latter is provided with a shoulder 116, which in revolving around the spindle 113 comes in contact with the stem 117 of the pawl 79. On the said stem 117 is also formed a pin 118, which comes in contact with the lever 70. When the balance-weight is rocked into the position shown at IV, the shoulder 116 comes in contact with the stem 117 and the action of the balance-weight tends to raise the pawl 79. The upward movement of the latter is limited by the pin 118, which comes in contact with the lever 70. When the lever 70 is moved down from the position shown at VI to the position of rest shown at IV, the balance-weight 80 rocks automatically by gravitation and falls in such a manner as to act by its weight on the pawl when the lever is again moved upward—to the position shown at V, for example.

We claim—

1. In a brake having a pawl-and-ratchet mechanism, the combination, with the cross-piece 2, carrying the brake-shoes, and connected with a rocking lever, of an adjustable pull-rod 10, of a hand-lever rocking about a fixed spindle and provided with a handle connected by a link or connecting-rod to the said pull-rod, of a toothed disk coöperating with the hand-lever, of a pawl pivoted to a fixed spindle and capable of acting on the said disk to hold the brake locked, of a balance-weight sliding on a stem integral with the pawl, and of a finger revolving with the lever and coming in contact with a pin fixed to the said balance-weight, to bring the same into a position in which it will press the pawl against the said toothed disk.

2. In a brake having a pawl-and-ratchet mechanism, the combination of an operating-lever rocking on the frame, of a toothed disk coöperating with the said lever, of a pawl rocking on the said frame, of a longitudinal tongue formed on an extension or stem of the said pawl, of a balance-weight in the form of an extended ring or link sliding on the said tongue, of a rod in projection on the said tongue and provided with a nut to hold the said balance-weight against the stem of the pawl, of a pin in projection on the balance-weight, and of a finger fixed to the said toothed disk to come in contact with the aforesaid pin and to cause the balance-weight to slide on the stem of the pawl.

3. In a brake having a pawl-and-ratchet mechanism, the combination of a cross-piece provided with brake-shoes and connected to a horizontal lever rocking under the vehicle, of two vertical levers rocking on one side of the vehicle, one of the said levers being connected to the said horizontal lever, and the other being connected to a pull device, and of a pull-rod connecting the two vertical levers in passing above the hub of one of the wheels of the vehicle.

4. A brake, comprising a lever, a beam provided with brake-shoes, longitudinal members connecting said lever and said beam, a ratchet, a pawl movable relatively thereto, and a weight connected with said pawl and movable relatively to the same.

5. A brake comprising a lever, a beam provided with brake-shoes, longitudinal members connecting said lever and said beam, and an arc-shaped weight flexibly connected with said pawl and free to move relatively thereto.

6. A brake comprising a beam, brake-shoes mounted thereon, a lever normally free to rock, mechanism connecting said lever and said beam, a ratchet-disk connected with said lever, a pawl for engaging said disk, a weight movably mounted upon said pawl and provided with a stop, and a finger connected with said lever and normally free to engage said stop for the purpose of shifting the position of said weight.

7. A brake, comprising a lever, a beam, brake-shoes mounted upon said beam, longitudinal members connecting said lever and said beam, means for adjusting the length of said longitudinal members for purposes of adjustment, a ratchet, a pawl movable relatively thereto, a weight slidably connected with said pawl, and means for shifting the position of the weight independently of the position of said pawl.

8. A brake, comprising a frame, a lever, a beam, brake-shoes mounted upon said beam, a toothed disk connected with said lever and free to move therewith, a pawl provided with a tongue integral therewith and pivotally mounted upon said frame, a weight slidably mounted upon said tongue and normally free to move relatively thereto, means controllable at will for clamping said weight rigidly upon said tongue, a stop for limiting the movement of said tongue, a boss mounted upon said weight, and a radially-projecting finger mounted rigidly upon said disk for engaging said boss on said weight.

In testimony that we claim the foregoing as our invention we have signed our names in presence of two subscribing witnesses.

EUGÉNE CANAPLE. [L. S.]
    FELIX THIÉBAUX. [L. S.]

Witnesses:
 EDMOND BLÉTRY,
 MAURICE ROUX.